(12) United States Patent
Sato et al.

(10) Patent No.: US 8,157,559 B2
(45) Date of Patent: Apr. 17, 2012

(54) INJECTION MOLDING APPARATUS

(75) Inventors: Takaaki Sato, Tochigi (JP); Takashi Kato, Tochigi (JP); Takeshi Kuriyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 12/791,581

(22) Filed: Jun. 1, 2010

(65) Prior Publication Data

US 2010/0310707 A1    Dec. 9, 2010

(30) Foreign Application Priority Data

Jun. 3, 2009  (JP) .................................. 2009-133691

(51) Int. Cl.
*B29C 45/20*    (2006.01)
(52) U.S. Cl. ........................ 425/549; 425/570; 425/572
(58) Field of Classification Search .................. 425/570, 425/571, 572, 549
See application file for complete search history.

(56) References Cited

U.S. PATENT DOCUMENTS

| 4,373,886 A | | 2/1983 | Hehl | |
| 5,955,121 A | * | 9/1999 | Gellert et al. | 425/549 |
| 7,189,071 B2 | * | 3/2007 | Olaru | 425/563 |
| 7,306,453 B2 | * | 12/2007 | Spuller et al. | 425/549 |

FOREIGN PATENT DOCUMENTS

| JP | 60-029616 B2 | 7/1985 |
| JP | 11-028743 A | 2/1999 |

* cited by examiner

*Primary Examiner* — Timothy Heitbrink
(74) *Attorney, Agent, or Firm* — Arent Fox, LLP

(57) ABSTRACT

An injection molding apparatus is provided with a die having a hot nozzle, and a manifold formed by a hot runner. A communication passage that is in communication with the cavity is provided in the die, a concave portion defined at an end portion of the die, and the hot nozzle includes a nozzle body of a cylindrical shape that is inserted in the communication passage, and a flange portion that is formed at an end side of the nozzle body and is exposed outside of the communication passage, in which a band heater that heats the nozzle body is inserted between the communication passage and the nozzle body, and a ring heater that heats this flange is inserted in the concave portion and between the communication passage and the flange.

2 Claims, 1 Drawing Sheet

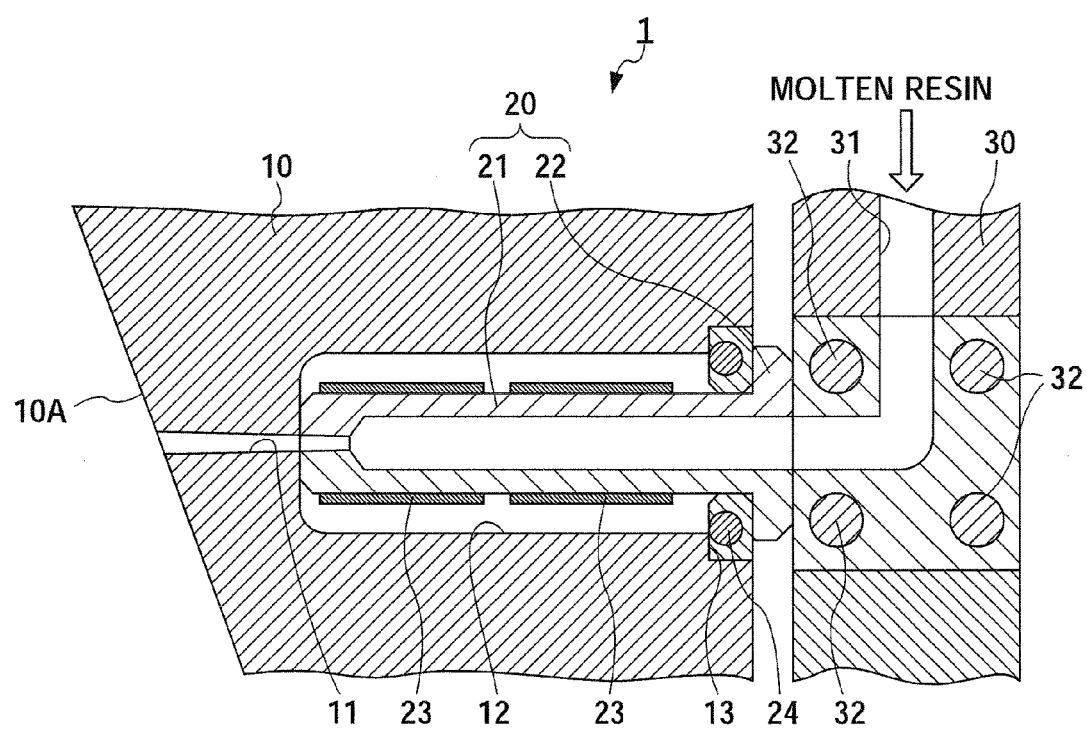

US 8,157,559 B2

INJECTION MOLDING APPARATUS

This application is based on and claims the benefit of priority from Japanese Patent Application No. 2009-133691, filed on 3 Jun. 2009, the content of which is incorporated herein by reference.

BACKGROUND OF THE INVENTION

1. Field of the Invention

The present invention relates to an injection molding apparatus. More specifically, it relates to an injection molding apparatus provided with a die having a hot nozzle that is in communication with a cavity, and a manifold formed by hot runner connected to this hot nozzle.

2. Related Art

Heretofore, an injection molding apparatus has been known that performs injection molding of thermoplastic resins. This injection molding apparatus is provided with a die having a hot nozzle that is in communication with a cavity, a manifold formed by hot runner connected to this hot nozzle, and a cylinder device that supplies molten resin to this hot runner.

A heater that heats the hot runner is built into the manifold.

A communication passage that communicates with a cavity surface is formed in the die.

The hot nozzle has a nozzle body of a cylindrical shape that is inserted into the communication passage of the die, and a flange portion formed at one end of this nozzle body that is exposed outside of the communication passage.

A band heater that heats the hot nozzle is provided between the communication passage and the nozzle body of the hot nozzle (refer to Patent Document 1).

According to the above injection molding apparatus, the hot runner is heated by the heater built into the manifold, and the hot nozzle is heated by the band heater. In this state, molten resin is supplied to the hot runner by the cylinder device. Then, this molten resin passes through the hot runner and hot nozzle, and is filled into the cavity of the die.

Incidentally, expanding color variation in molded articles has been demanded due to consumer tastes having diversified in recent years.

In order to solve this problem, although techniques have been considered in which a plurality of injection molding apparatuses is provided and that produces a molded article of differing colors for each injection molding apparatus, a plurality of dies become necessary, and thus the cost is high due to the equipment increasing in size.

Then, a technique has been proposed in which a plurality of cylinder devices that supply molten resin of different colors is prepared, and these cylinder devices are connected to one manifold (refer to Patent Document 2). According to this technique, molded articles of different colors can be produced in one die by selectively driving the cylinder devices.

[Patent Document 1] Japanese Unexamined Patent Application Publication No. H11-28743
[Patent Document 2] Japanese Examined Patent Application No. S60-29616

SUMMARY OF THE INVENTION

However, with the techniques described above, it is necessary to perform injection molding by supplying resin of a new color to the hot runner due to resin retained inside the hot runner and hot nozzle being discharged when switching the color of the resin (hereinafter called throw-away molding). The color of the molded article by this throw-away molding is a mixed color of the new color and the previous color.

The resin of the previous color cures and adheres to the insides of the hot runner and the hot nozzle, and the resin thus adhered cannot be completely discharged by throw-away molding one time. Accordingly, throw-away molding is repeated until the color of the molded article has completely changed to the new color. Since this molded article from throw-away molding cannot be used as a finished product, there has been a problem in there being a lot of wasted material.

The present invention has an object of providing an injection molding apparatus that can reduce material waste.

The present inventors have ascertained that the cause of a large amount of resin adhering to the vicinity of the flange portion of the hot nozzle and the number of times throw-away molding being great is resin in the vicinity of this flange material.

An injection molding apparatus of the present invention (e.g., injection molding apparatus 1 described later) is provided with a die (e.g., die 10 described later) having a hot nozzle (e.g., hot nozzle 20 described later) which is in communication with a cavity (e.g., cavity 10A described later), and a manifold (e.g., manifold 30 described later) formed by a hot runner (e.g., hot runner 31) connected to the hot nozzle, and fills molten resin into the cavity of the die by passing from the hot runner through the hot nozzle, in which: a communication passage (e.g., nozzle mounting portion 12 described later) that is in communication with the cavity is provided in the die; the hot nozzle includes a nozzle body (e.g., nozzle body 21 described later) of a cylindrical shape that is inserted in the communication passage of the die, and a flange portion (e.g., flange portion 22 described later) that is formed at an end side of the nozzle body and is exposed outside of the communication passage; a heater (e.g., band heater 23 described later) that heats the nozzle body is inserted between the communication passage and the nozzle body; and a heater (e.g., ring heater 24) that heats the flange portion is inserted between the communication passage and the flange portion.

According to this invention, in addition to the communication passage and the nozzle body, a heater is inserted between the communication passage and the flange portion as well. Accordingly, resin of a great amount can be prevented from adhering to a vicinity of this flange portion since the flange portion of the hot nozzle can be reliably heated by way of driving the heater. Therefore, since it is possible to make the resin layer adhering to the channel thin and uniform, the number of times conducting throw-away molding is made few, and thus material waste can be reduced.

In this case, it is preferably for the flange portion to abut the manifold.

Since heat radiation is made easy at the boundary surface of the channel of molten resin, the resin is at risk of adhering.

However, according to this invention, since the flange portion is made to abut the manifold, the boundary surface of the channel is only a connecting portion of the flange portion and the manifold. Therefore, compared to a case in which there is a plurality of boundary surfaces, material waste can be further reduced since heat radiation can be prevented.

According to the present invention, in addition to between the communication passage and the nozzle body, a heater is inserted between the communication passage and the flange portion as well. Accordingly, resin of a great amount can be prevented from adhering to a vicinity of this flange portion since the flange portion of the hot nozzle can be reliably heated by way of driving the heater. Therefore, since it is possible to make the resin layer adhering to the channel thin and uniform, the number of times conducting throw-away molding is made few, and thus material waste can be reduced.

BRIEF DESCRIPTION OF THE DRAWINGS

FIG. 1 is a schematic diagram of an injection molding apparatus according to an embodiment of the present invention.

DETAILED DESCRIPTION OF THE INVENTION

An embodiment of the present invention will be explained below based on the drawing.

FIG. 1 is a schematic diagram of an injection molding apparatus according to an embodiment of the present invention.

The injection molding apparatus 1 is an apparatus that performs injection molding of thermoplastic resin. The injection molding apparatus 1 is provided with a die 10 having a hot nozzle 20 that is in communication with a cavity 10A, a manifold 30 that is formed by a hot runner 31 connected to the hot nozzle 20 of this die 10, and a plurality of cylinder devices not illustrated that supply molten resin to this hot runner 31.

Heaters 32 that heat the hot runner 31 are built into the manifold 30.

A communication passage 11 that is in communication with the cavity 10A is formed in the die 10. A portion on a side of the manifold 30 of this communication passage 11 is a nozzle mounting portion 12 that has a large inside diameter. In addition, a concave portion 13 is formed at an end portion on a side of the manifold 30 of this nozzle mounting portion 12.

The hot nozzle 20 has a nozzle body 21 of a cylindrical shape, and a flange portion 22 that is formed at one end of this nozzle body 21.

The nozzle body 21 is inserted into the nozzle mounting portion 12 of the die 10. A band heater 23 of a cylindrical shape that surrounds the nozzle body 21 is inserted between the nozzle mounting portion 12 and the nozzle body 21.

The flange portion 22 of the hot nozzle 20 is exposed outside of the nozzle mounting portion 12, and abuts the manifold 30. A ring heater 24 of a ring shape is inserted between the concave portion 13 of the nozzle mounting portion 12 and the flange portion 22.

According to the above injection molding apparatus 1, first, the hot runner 31 and the hot nozzle 20 are heated by driving the heaters 32 of the manifold 30 as well as the band heater 23 and the ring heater 24 of the die 10.

Next, in this state, molten resin is supplied to the hot runner 31 by the cylinder device, which is not illustrated. Then, this molten resin passes through the hot runner 31 and the hot nozzle 20, and is filled into the cavity 10A of the die 10.

For example, although the temperature of the die is approximately 20° C. when performing injection molding, it is necessary to make the temperature of the hot nozzle to be approximate 200° C. As a result, in a case where a ring heater is not provided, the temperature of this flange portion drops from 200° C. to about 20 to 30° C. due to heat radiating from the contacting portion of the flange portion of the hot nozzle and the die. However, this drop in temperature of the flange portion can be suppressed by providing a ring heater. More specifically, the number of times of throw-away molding, which has traditionally been at least 20 times, can be reduced to on the order of 6 or 7 times.

According to the present embodiment, there are the following effects.

(1) In addition to between the nozzle mounting portion 12 and the nozzle body 21, the ring heater 24 is also inserted between the nozzle mounting portion 12 and the flange portion 22. Accordingly, since it is possible to reliably heat the flange portion 22 of the hot nozzle 20 by way of driving the ring heater 24, a great amount of resin can be prevented from adhering in the vicinity of this flange portion 22. Therefore, since it is possible to make the resin layer adhering to the channel thin and uniform, the number of times conducting throw-away molding is made few, and thus material waste can be reduced.

(2) Since the flange portion 22 is made to abut the manifold 30, the boundary surface of the channel becomes only a connecting portion of the flange portion 22 and the manifold 30. Therefore, compared to a case in which there is a plurality of boundary surfaces, material waste can be further reduced since heat radiation can be prevented.

It should be noted that the present invention is not to be limited to the embodiment, and modifications, improvements and the like within a scope that can achieve the object of the present invention are included in the present invention.

What is claimed is:

1. An injection molding apparatus that is provided with a die having a hot nozzle which is in communication with a cavity, and a manifold which is formed by a hot runner connected to the hot nozzle, and that fills molten resin into the cavity of the die by passing from the hot runner through the hot nozzle, wherein:

a communication passage that is in communication with the cavity is provided in the die;

a concave portion defined at an end portion of the die;

the hot nozzle comprises a nozzle body of a cylindrical shape that is inserted in the communication passage of the die, and a flange portion that is formed at an end side of the nozzle body and is exposed outside of the communication passage;

a heater that heats the nozzle body is inserted between the communication passage and the nozzle body; and a ring heater that heats the flange portion is inserted in the concave portion and between the communication passage and the flange portion.

2. An injection molding apparatus according to claim 1, wherein the flange portion abuts the manifold.

* * * * *